G. L. BUMBAUGH.
DISABLER FOR AEROPLANE CONTROLLERS.
APPLICATION FILED JAN. 2, 1917.

1,412,771.

Patented Apr. 11, 1922.
2 SHEETS—SHEET 1.

WITNESSES:
Frank A. Sahle
Josephine Gasper

INVENTOR
George L. Bumbaugh,

BY
Hood & Ashley.
ATTORNEYS

G. L. BUMBAUGH.
DISABLER FOR AEROPLANE CONTROLLERS.
APPLICATION FILED JAN. 2, 1917.
1,412,771.
Patented Apr. 11, 1922.
2 SHEETS—SHEET 2.
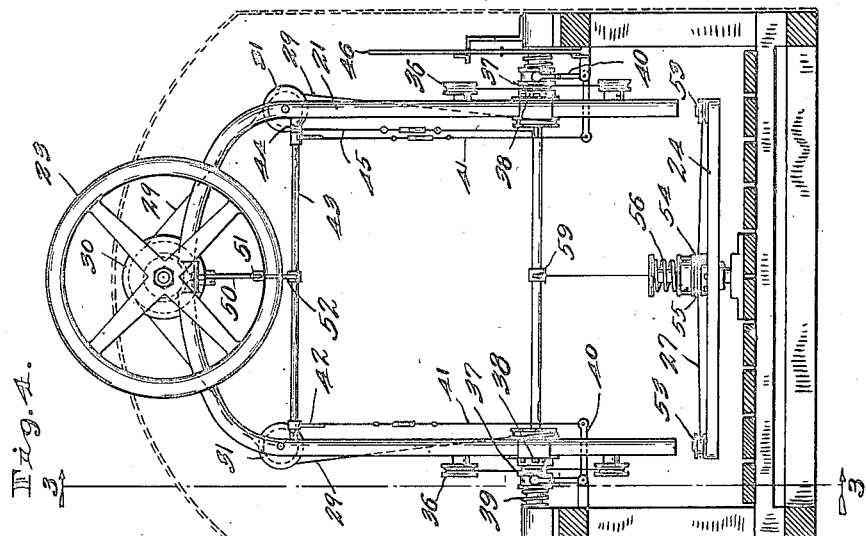
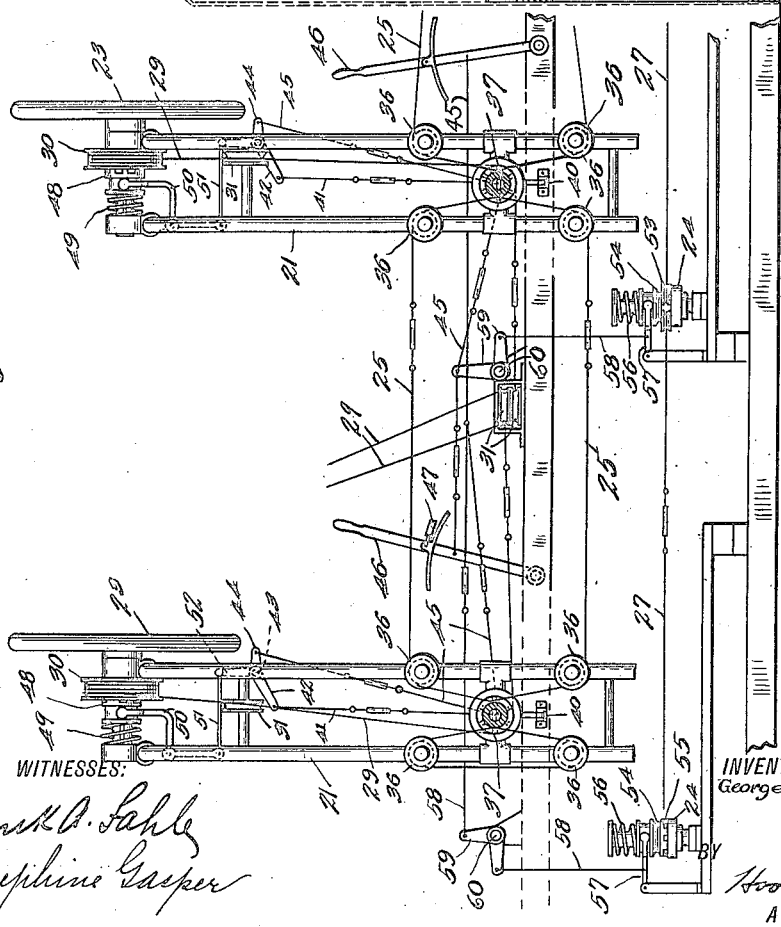

UNITED STATES PATENT OFFICE.

GEORGE L. BUMBAUGH, OF INDIANAPOLIS, INDIANA, ASSIGNOR TO GEORGE B. SCHLEY, TRUSTEE FOR SAID BUMBAUGH AND WILLIAM B. PAUL.

DISABLER FOR AEROPLANE CONTROLLERS.

1,412,771.      Specification of Letters Patent.    Patented Apr. 11, 1922.

Application filed January 2, 1917. Serial No. 140,221.

*To all whom it may concern:*

Be it known that I, GEORGE L. BUMBAUGH, a citizen of the United States, residing at Indianapolis, in the county of Marion and State of Indiana, have invented a new and useful Disabler for Aeroplane Controllers, of which the following is a specification.

In aeroplanes it is sometimes desirable to have the control mechanism in duplicate, so that the control operations may be effected by either of two operators. This is particularly advantageous for teaching purposes, when one of the operators is a pupil and the other the teacher, so that the teacher may assist the pupil in obtaining the desired control and in preventing accidents. It is also desirable in many other cases, as in aeroplanes used in war, when one of the operators may be disabled.

However, when this duplicate control is provided, it has sometimes happened that the less competent or the disabled operator holds on to or falls against his control apparatus in such a way as to prevent the proper control from being obtained by the other operator; as for instance when a physically strong pupil through excitement holds the control mechanism with so much force that a physically weaker teacher is unable to take the control away from him and make the necessary controlling operations. This has sometimes resulted in accidents, and near accidents.

The object of the present invention is to make it possible for one operator to render inoperative the control mechanism of the other, when that is necessary or desirable; so that, for instance, the teacher who is physically out-matched by his pupil can nevertheless take the control away from the pupil by throwing out the latter's control mechanism absolutely. This disabling apparatus may be so that either operator can throw out the other's control mechanism, or so that only one operator may disable the control mechanism of the other.

Figure 1:
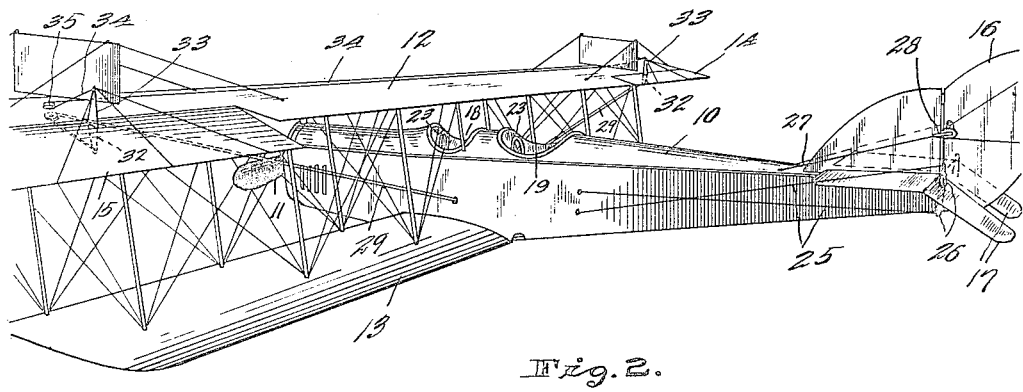
Figure 2:
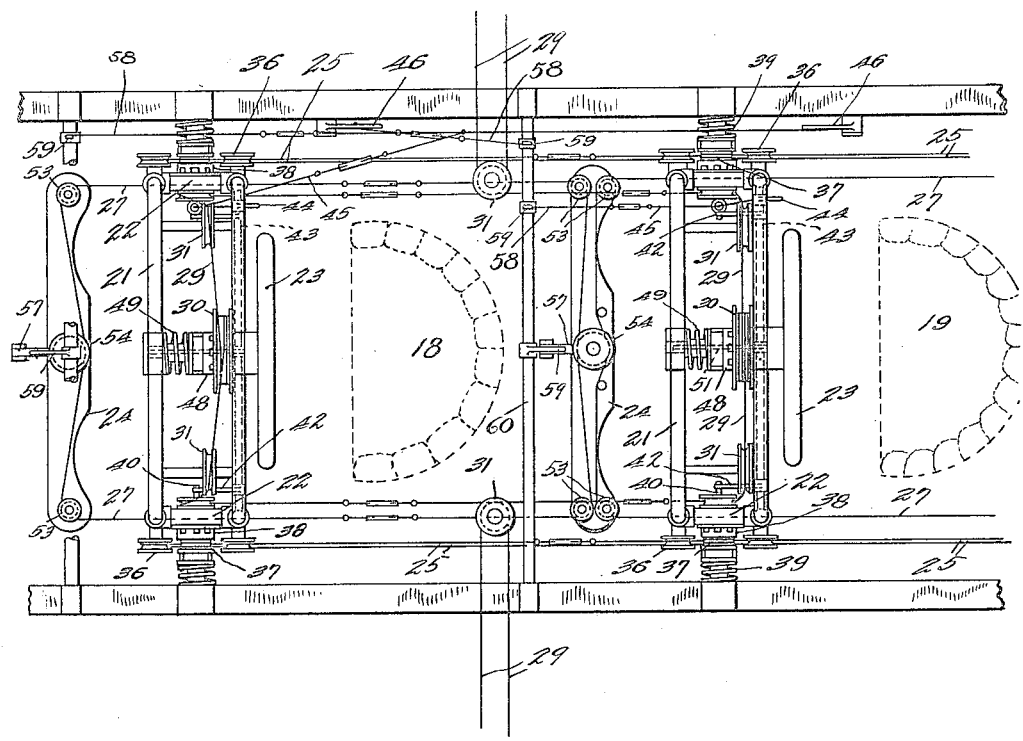

The accompanying drawings illustrate my invention. Fig. 1 is a perspective view of an aeroplane equipped with my invention; Fig. 2 is a plan of the duplicate control mechanism; Fig. 3 is a side elevation of such duplicate control mechanism; and Fig. 4 is a rear elevation thereof.

I have shown my invention in connection with a tractor biplane, having the usual fuselage 10 with a propeller 11 at the front, upper and lower planes 12 and 13, ailerons 14 and 15 at the right and left sides respectively of the upper plane 12, a rudder 16 at the rear, and a pair of elevators 17 between which the rudder 16 is located. The fuselage is provided with two seats 18 and 19, for two operators, these seats being arranged one behind the other.

In front of each seat is a set of control mechanism, comprising an inverted U-shaped frame 21 pivoted to swing about a horizontal transverse axis on trunnions 22 near its lower end, a steering wheel 23 mounted to turn about a horizontal longitudinal axis in the upper end of the frame 21, and a foot bar 24 arranged to swing about a vertical axis, the foot bar being located slightly in front of the inverted U-shaped frame 21. The two U-shaped frames 21 are interconnected on each side by a cable 25, each of these cables interconnecting the two frames both above and below the trunnions 22 and extending rearward from the rear frame 21 in two stretches which cross each other, as is clear from Fig. 1, and are connected to upwardly and downwardly projecting arms 26 on one of the elevators 17, so that as one frame 21 is swung forward or backward the other frame 21 is normally similarly swung and the two elevators 17 are lowered or raised. The two bars 24 are interconnected by a cable 27, this cable joining the two foot bars at both ends, as is clear from Fig. 2, and extending rearward from the two ends of the rear cross bar 24 in two stretches which do not cross and which are connected to laterally projecting arms 28 from the two sides of the rudder 16, so that as one foot bar 24 is swung about its axis the other foot bar 24 is normally similarly swung, and the rudder 16 is turned to one side or the other. A cable 29 passes around a drum 30 on the shaft of each steering wheel 23, and the two stretches of this cable pass from such drum 30 over suitable pulleys 31 on the frame 21 and on the frame of the fuselage to downwardly projecting arms 32 on the two ailerons 14 and 15 respectively, these cables 29 from the two drums 30 being shown as extending separately all the way to the arms 32, though if desired they may be joined together in a single cable at any suitable point before reaching such arms. Each aileron is also provided with an upwardly extending arm 33, and the two arms 33 of the two ailerons are joined by a cable 34 which passes over suitable pulleys 35 carried by the framework of the upper plane 12. Thus by turning either steering wheel 23, the ailerons 14 and 15 are swung in opposite directions, one upward and the other downward, to obtain the desired balance; and the other steering wheel 23 is moved correspondingly to that which produces the aileron movement.

The movements as thus far described are normal movements, so that for any movement of the frame 21, the foot bar 24, and the steering wheel 23, of one set of control mechanism there is a corresponding movement of a similar part of the other set. If this were all, the holding fast of one set of control mechanism, by accident or design, would make it impossible for the operator at the other set to obtain the necessary controlling movements.

Therefore, the cables 25, 27, and 29 are releasably, and not rigidly, connected with the frame 21, the foot bar 24, and the steering wheel 23 of one or both sets of control mechanism; and the release of these cables for that set or for each set of control mechanism is under the control of a release handle near the other set. The release may work for each set of control mechanism from the other set, or for only one set of control mechanism from the other set.

This can be accomplished in various ways. In the form in which I have shown it, I have passed the cables over winding drums which are releasably connected to the several controlling parts. Thus each stretch of the cable 25 coming forward from the upper or lower arm 26 on each elevator 17, after crossing the other stretch, passes over a pulley 36 on the rear portion of the rear frame 21 and below or above the trunnion 22, passes thence upward or downward around a winding drum 37 on the trunnion 22, thence downward or upward over a similar pulley 36 on the front portion of such rear frame 21 and below or above the trunnion 22, and then passes to the forward frame over similar pulleys 36 and around a similar winding drum 37 to meet the other stretch. The drum 37 on each side of each frame 21 is not rigid on the trunnion 22, but is connected thereto by a suitable clutch 38, which is spring-pressed to set position by a spring 39 on such trunnion, and may be released to disconnect the drum 37 from the frame 21 by the forked end of a bell-crank lever 40, the two bell-crank levers 40 on each frame 21 being connected by links or cable lengths 41 to arms 42 on a cross shaft 43 near the upper end of the frame 21, which shaft 43 is also provided with an arm 44 connected by a cable 45 passing through an eye on the pivotal axis of the frame 21 to a release lever 46 near the other set of control mechanism, being connected at intermediate points if desired to other mechanism, such as the bell-crank 59 to be described later. Thus by operating the release lever 46 to pull its associated cable 45, the clutches 38 on the other frame 21 from that to which such control lever is adjacent are released, so that tilting of such frame is without effect on the elevators 17; though normally, when the clutches 38 are set, the cable 25 is held from movement relative to such frame and the tilting of the frame operates the elevators. If desired, either release lever 46 may be locked against movement by any suitable padlock 47; or otherwise prevented from being operated, so that it will be possible for but one of the operators to render the control mechanism of the other inoperative.

In the same way, the drum 30 of each set of control mechanism is not fast on the shaft of its steering wheel 23, but is connected thereto by a clutch 48, which is spring-pressed to set position by a spring 49 but may be released by the forked end of a bell-crank lever 50 connected by a link 51 to an arm 52 on the cross shaft 43, so that by the operation of the connected release lever 46 the shaft 43 is rotated and the clutch 48 is released as well as the clutches 37, thereby also rendering the steering wheel 23 associated with such clutch 48 inoperative to move the ailerons 14 and 15.

Similarly, the two stretches of the cable 27 pass over suitable pulleys 53 on the ends of the rear foot bar 24 and thence around a winding drum 54 loose on the axis of such rear foot bar, thence over similar pulleys 53 on the ends of the foot bar 24, thence to the forward cross bar 24 and over similar pulleys 53 and around a similar winding drum 54 on such forward cross bar. Each winding drum 54 is normally connected to its associated foot bar 24 by a clutch 55, which is spring-pressed to set position by a spring 56 but may be moved to release position by a forked lever 57 connected by a cable 58 and crank arms 59 on a cross shaft 60 to the cable 45 leading to the release lever 46 near the other set of control mechanism, so that by the operation of such release lever the clutch 55 is disengaged as well as the clutches 37 and 48, thus rendering the foot bar 24 associated with such clutch inoperative for affecting the rudder 16. Thus by throwing either release lever 46 to release position, the other set of control mechanism is rendered completely inoperative, its clutches 38 being disengaged to render the tilting of the frame 21 ineffective on the elevators 17, its clutch 48 being disengaged to render the turning of its steering wheel 23 ineffective on the ailerons 14 and 15, and its clutch 55 being disengaged to render the movement of its foot bar 24 ineffective on the rudder 16. By this arrangement, either operator may render the control mechanism of his companion inoperative; or if one release lever is locked or otherwise disabled the chief operator may render inoperative the control mechanism of his companion operator while such companion operator is prevented from rendering inoperative the control mechanism of his chief.

I claim as my invention:

1. An air traveling vehicle having a rudder, an elevator, and a balancing device; two sets of control mechanism each of which includes controlling devices for said rudder, said elevator, and said balancing device respectively, the control device in each set of control mechanism for controlling said balancing device being connected to the balancing device otherwise than through the corresponding control device of the other set of control mechanism; and a release device associated with one set of control mechanism for releasing said rudder, elevator, and balancing devices from the controlling devices of the other set of control mechanism.

2. An air traveling vehicle having a rudder, an elevator, and a balancing device; two sets of control mechanism each of which includes controlling devices for said rudder, said elevator, and said balancing device respectively, the control device in each set of control mechanism for controlling said balancing device being connected to the balancing device otherwise than through the corresponding control device of the other set of control mechanism; and a release device associated with each set of control mechanism for releasing said rudder, elevator, and balancing device from the controlling devices of the other set of control mechanism.

3. An air traveling vehicle having a rudder, an elevator, and a balancing device; two sets of control mechanism each of which includes controlling devices for said rudder, said elevator, and said balancing device respectively; a release device associated with each set of control mechanism for releasing said rudder, elevator, and balancing device from the controlling devices of the other set of control mechanism, and means for preventing the operation of the release device of either set of control mechanism.

4. An air traveling vehicle having a rudder, an elevator, and a balancing device; two sets of control mechanism each of which includes controlling devices for said rudder, said elevator, and said balancing device respectively, the control device in each set of control mechanism for controlling said balancing device being connected to the balancing device otherwise than through the corresponding control device of the other set of control mechanism; and a release device for releasing said rudder, elevator, and balancing device from the controlling device of one of said sets of control mechanism.

In witness whereof, I have hereunto set my hand at Indianapolis, Indiana, this 28th day of December, A. D. one thousand nine hundred and sixteen.

GEORGE L. BUMBAUGH.